(12) United States Patent
Cornec

(10) Patent No.: US 11,808,165 B2
(45) Date of Patent: Nov. 7, 2023

(54) AIRCRAFT TURBOMACHINE ROTOR COMPRISING A DAMPING DEVICE

(71) Applicant: SAFRAN AIRCRAFT ENGINES, Paris (FR)

(72) Inventor: Nicolas Gérard Bénito Cornec, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 182 days.

(21) Appl. No.: 17/436,349

(22) PCT Filed: Mar. 4, 2020

(86) PCT No.: PCT/EP2020/055599
§ 371 (c)(1),
(2) Date: Sep. 3, 2021

(87) PCT Pub. No.: WO2020/178300
PCT Pub. Date: Sep. 10, 2020

(65) Prior Publication Data
US 2022/0162946 A1    May 26, 2022

(30) Foreign Application Priority Data
Mar. 6, 2019   (FR) ...................... 1902260

(51) Int. Cl.
*F01D 5/10*    (2006.01)
*F01D 5/30*    (2006.01)

(52) U.S. Cl.
CPC ............. *F01D 5/10* (2013.01); *F01D 5/30* (2013.01); *F05D 2220/323* (2013.01); *F05D 2240/24* (2013.01); *F05D 2260/96* (2013.01)

(58) Field of Classification Search
CPC ................. F01D 5/10; F01D 5/22; F01D 5/30
See application file for complete search history.

(56) References Cited

U.S. PATENT DOCUMENTS

| 4,781,534 A | 11/1988 | Ferleger |
| 5,733,103 A * | 3/1998 | Wallace .................... F01D 5/10 |
| | | 416/500 |

(Continued)

FOREIGN PATENT DOCUMENTS

| CA | 604830 A | 9/1960 |
| FR | 2915510 A1 | 10/2008 |

(Continued)

OTHER PUBLICATIONS

Search Report from FR Intellectual Property Office on corresponding FR application (FR1902260) dated Oct. 9, 2019.

(Continued)

*Primary Examiner* — Courtney D Heinle
*Assistant Examiner* — John S Hunter, Jr.
(74) *Attorney, Agent, or Firm* — KOS IP Law LLP

(57) ABSTRACT

An aircraft turbomachine rotor has a rotor disc extending transversely with respect to a longitudinal axis X, a plurality of blades, and a damping device. The damping device having: a support ring arranged transversely with respect to the longitudinal axis X and mounted on the outer periphery of the rotor disc, and has a plurality of damping members that are attached to the support ring and project upstream from the support ring, each damping member being configured to extend at least under a platform of a blade so as to exert a radially outward force to dampen the radial movement of the blade when the turbomachine is in operation.

20 Claims, 7 Drawing Sheets

(56) References Cited

U.S. PATENT DOCUMENTS

| | | | |
|---|---|---|---|
| 9,429,030 B2 * | 8/2016 | Bart | F01D 5/3084 |
| 10,436,032 B2 * | 10/2019 | Pankratov | F02C 3/04 |
| 10,450,865 B2 * | 10/2019 | Pankratov | F16F 15/129 |
| 2008/0253895 A1 | 10/2008 | Gekht et al. | |

FOREIGN PATENT DOCUMENTS

| | | |
|---|---|---|
| FR | 2918702 A1 | 1/2009 |
| GB | 2062119 A | 5/1981 |
| RU | 2493370 C2 | 9/2013 |
| RU | 2572654 C2 | 1/2016 |
| SU | 435360 A1 | 7/1974 |
| WO | 2012/020195 A1 | 2/2012 |

OTHER PUBLICATIONS

International Search Report and Written Opinion on related PCT application (PCT/EP2020/055599) from International Searching Authority (EPO) dated May 13, 2020.

\* cited by examiner

AIRCRAFT TURBOMACHINE ROTOR COMPRISING A DAMPING DEVICE

TECHNICAL FIELD

The present invention relates to the field of turbomachines used for the propulsion of an aircraft. The invention more particularly relates to an aircraft turbomachine rotor comprising a device for damping rotor blades.

BACKGROUND

In a known manner, an aircraft turbomachine extends longitudinally along an axis X and makes it possible to displace the aircraft from a flow of air entering into the turbomachine and circulating from upstream to downstream. Hereafter, the terms "upstream" and "downstream" are defined with respect to the longitudinal axis X oriented from upstream to downstream. Similarly, the terms "interior" and "exterior" are defined along the radial direction with respect to the longitudinal axis X. In a known manner, the turbomachine comprises a compressor, a combustion chamber and a turbine to rotationally drive the compressor. The compressor comprises one or more rotors, mounted in line along a longitudinal axis X to compress the flow of air circulating from upstream to downstream in a primary flow path of the turbomachine.

In practice, a rotor comprises a rotor disc, extending transversally with respect to the longitudinal axis X, which is integral with a power transmission shaft. The rotor disc comprises a plurality of housings, also called honeycombs, formed on the outer periphery of the rotor disc, in which are respectively mounted the blades by axial insertion along the longitudinal axis X. The blades extend in a same plane transversal to the longitudinal axis X. Each blade extends radially with respect to the longitudinal axis X and comprises successively a mounting root, radially interior, configured to be mounted in one of said housings of the rotor disc, a platform, making it possible to maintain at a distance a predetermined blade with respect to adjacent blades and to reconstitute the inner surface of the air flow path, and a radial air deflector vane, radially exterior.

When the turbomachine is in operation, each blade is mainly subjected to three types of stresses, namely centrifugal forces, aerodynamic disruptions and disruptions to the balance of the rotor disc. Under the effect of centrifugal forces, each mounting root presses against the outer part of the housing in which it is mounted and exerts a pressure dependent on the speed of rotation of the rotor. During a change of speed of the turbomachine, the centrifugal forces vary, which leads to pressure variations at the level of the housings, at the origin of relative radial movements with respect to the longitudinal axis X between each mounting root and the housing in which it is mounted. The aerodynamic disruptions create for their part stress variations of the flow of air on the vanes, also inducing relative movements between each blade root and the housing in which it is mounted. Finally, when the mass of the disc of the rotor is not balanced, that is to say in the presence of imbalances, a relative movement also exists between each blade root and the housing in which it is mounted.

The repetition of relative movements leads to phenomena of wear of the mounting roots of the blades and the housings of the rotor disc, which reduces their lifetime. To limit these wear phenomena, it is known to introduce an additional part between a blade root and its housing.

It has been proposed in the patent application FR2918702A1 to wrap the mounting root of a blade with a foil comprising a viscoelastic material in order to absorb the relative movements. Nevertheless, during its use, each foil is liable to be displaced axially and to enter into contact with another rotor disc positioned downstream of the rotor disc in which the foil is mounted. Such a displacement is liable to increase the wear of the mounting roots of the blades and the downstream rotor disc, which presents a drawback.

Alternatively, it has been proposed in the patent application FR2915510A1 to use a damper comprising a sole, bearing on the outer periphery of the disc, a flyweight, contributing to balancing the mass of the rotor disc, and a spring connecting the sole and the flyweight such that the flyweight bears on the platforms of two adjacent blades. The damper also makes it possible to limit relative movements between the blades and the housings. However, as for the foil, each damper is liable to be displaced axially and to enter into contact with a rotor disc positioned downstream. As described previously, such a displacement is liable to increase wear of the mounting roots of the blades and the downstream rotor disc, which presents a drawback.

In the field of turbine rotors, it is known from the patent application WO2012/020195A1 to mount ring sectors in the throat of the rotor disc, which comprise ventilation orifices, radial blocking wedges and teeth for axially blocking the blade roots. Such wedges are not however suitable for damping the relative movement of the blade roots in their housings but to block them and are for this reason mounted in the housings under each blade root.

Also in the field of turbine rotors, it is known from the patent application U.S. Pat. No. 4,781,534A to press against one or both radial face(s) of the rotor disc a ring with tabs mounted in the housings under each blade root in order to reduce air leakages due to the misalignment of the disc and the blades, notably with tree shaped roots. Such tabs have the same drawbacks as the blocking wedges described previously.

There thus exists a need for a damping device making it possible to reduce the relative movements between the rotor blades and their housings without causing wear.

SUMMARY

The invention relates to a damping device for turbomachine rotor, said turbomachine extending longitudinally along an axis X, said rotor comprising a rotor disc extending transversally with respect to the longitudinal axis X and a plurality of blades, said rotor disc comprising a plurality of housings formed on the outer periphery of the rotor disc, each blade extending radially with respect to the longitudinal axis X and comprising a mounting root, radially interior, configured to be mounted in one of said housings, a platform and a radially exterior air deflector vane.

The invention is remarkable in that the damping device comprises:

a support ring configured to extend transversally with respect to the longitudinal axis X and configured to be positioned on the outer periphery of the rotor disc, and a plurality of damping members, integral with the support ring and extending projecting upstream from the support ring, each damping member being configured to extend under at least one platform of a blade so as to exert a radial force outwards so as to damp the radial displacement of said blade when the turbomachine is in operation.

Thanks to the invention, advantageously no relative movement exists between the damping members given that they are connected by the support ring, which limits wear. In addition, their radial position is determined in a precise manner. Further, the damping members make it possible to guide the platforms of the blades during their mounting and to press them radially outwards when the turbomachine is in operation. Such a damping device has a reduced bulk and a low mass. The leak tightness of the rotor is furthermore improved.

In a preferred manner, the damping device is constituted of a support ring and a plurality of damping members. Such a damping device has a simple structure, which makes it possible to reduce its mass, bulk and cost.

Preferably, each damping member is mounted in a prestressed manner under at least one platform of a blade so as to exert a radial force outwards so as to damp the radial displacement of said blade when the turbomachine is in operation. In other words, the damping members are mounted in contact with the blade platforms and, under the effect of centrifugal forces, the damping members exert an important radial force on the blade platforms outwards to damp efficiently the displacement of the blades. The pressing of the blades when the turbomachine is in operation is improved by the prestressed mounting of the damping members against the blade platforms.

Preferentially, each damping member is in the form of a spring blade configured to exert a radial force outwards. Such a form makes it possible to achieve optimal surface pressing while limiting the mass and the bulk.

Preferably, the damping members are spread out uniformly on the circumference of the support ring. Thus, the radial force of the damping members is applied in a homogeneous manner.

In a preferred manner, at least one damping member comprises a proximal portion connected to the support ring, a freely mounted distal portion and a central portion formed between the proximal portion and the distal portion.

According to a preferred aspect, the proximal portion has a thickness less than the thickness of the central portion. The proximal portion thus advantageously forms a flexible portion making it possible to articulate the damping member with respect to the support ring in order to achieve an optimal pressing force.

According to another preferred aspect, the distal portion has a thickness greater than the thickness of the central portion. The distal end thus has a greater mass in order to exert a more important pressing force under the effect of centrifugal forces. This is advantageous given that the distal end is situated under a median portion of the platform and thus makes it possible to act in the axis of its center of gravity. The damping is thus improved.

Preferably, at least one damping member comprises a flat outer face. Thus, the outer face makes it possible to form a flat support guaranteeing uniform pressing limiting vibrations. Further preferably, the inner face comprises a protuberance, in particular, at its distal end. Such a protuberance makes it possible to reinforce the pressing by increasing the centrifugal effect, which is advantageous given that the distal end is situated under a median portion of the blade platforms. Further, the protuberance forms a reserve of material being able to be easily machined in order to correct an imbalance of the rotor.

The invention also relates to a rotor for turbomachine extending longitudinally along an axis X, said rotor comprising a rotor disc extending transversally with respect to the longitudinal axis X and a plurality of blades, said rotor disc comprising a plurality of housings formed on the outer periphery of the rotor disc, each blade extending radially with respect to the longitudinal axis X and comprising a mounting root, radially interior, configured to be mounted in one of said housings, a platform and a radially exterior air deflector vane, the rotor comprising a damping device, such as described previously, of which the support ring is positioned on the outer periphery of the rotor disc and of which the damping members extend projecting upstream from the support ring, each damping member extending under at least one platform of a blade so as to exert a radial force outwards so as to damp the radial displacement of said blade when the turbomachine is in operation.

In a preferred manner, each damping member extends under at least the platforms of two blades. Thus, a damping member makes it possible to apply a uniform pressing between two adjacent blades.

Preferably, the rotor comprising a downstream rotor disc, positioned downstream of the rotor disc in which the blades are mounted, the support ring is positioned against the downstream rotor disc. Any downstream movement of the damping device is thus eliminated.

Preferably, each damping member extends cantilevered upstream. Thus there is no wear of the outer periphery of the rotor disc by the damping members.

The invention also relates to a turbomachine extending longitudinally along an axis X comprising a rotor such as described previously.

The invention further relates to a method for using a turbomachine extending longitudinally along an axis X and comprising a rotor such as described previously, the method comprising:

a step of operating the turbomachine, during which the rotor disc is rotated at a rotation speed along the longitudinal axis X and each mounting root of a blade is displaced radially towards the outer part of its housing by centrifugal effect and a step of radially exterior pressing of each blade by at least one damping member so as to damp the radial displacement of the mounting root of said blade in its housing.

The invention further relates to a method for manufacturing a damping device, such as described previously, comprising:

a step of cutting out of a thin panel flat contours of the damping device, a step of stamping the cut damping members so as to confer on them their relief and their thickness, and a step of folding the stamped damping members so as to orient them in the axial direction upstream.

A damping device may thus be manufactured in a practical, rapid and cheap manner.

BRIEF DESCRIPTION OF THE DRAWINGS

The invention will be better understood on reading the description that follows, given uniquely as an example, and by referring to the appended drawings given as non-limiting examples, in which identical references are given to similar objects and in which.

It should be noted that the figures set out the invention in a detailed manner for implementing the invention, said figures obviously being able to serve to better define the invention if needs be.

DETAILED DESCRIPTION

Figure 1:
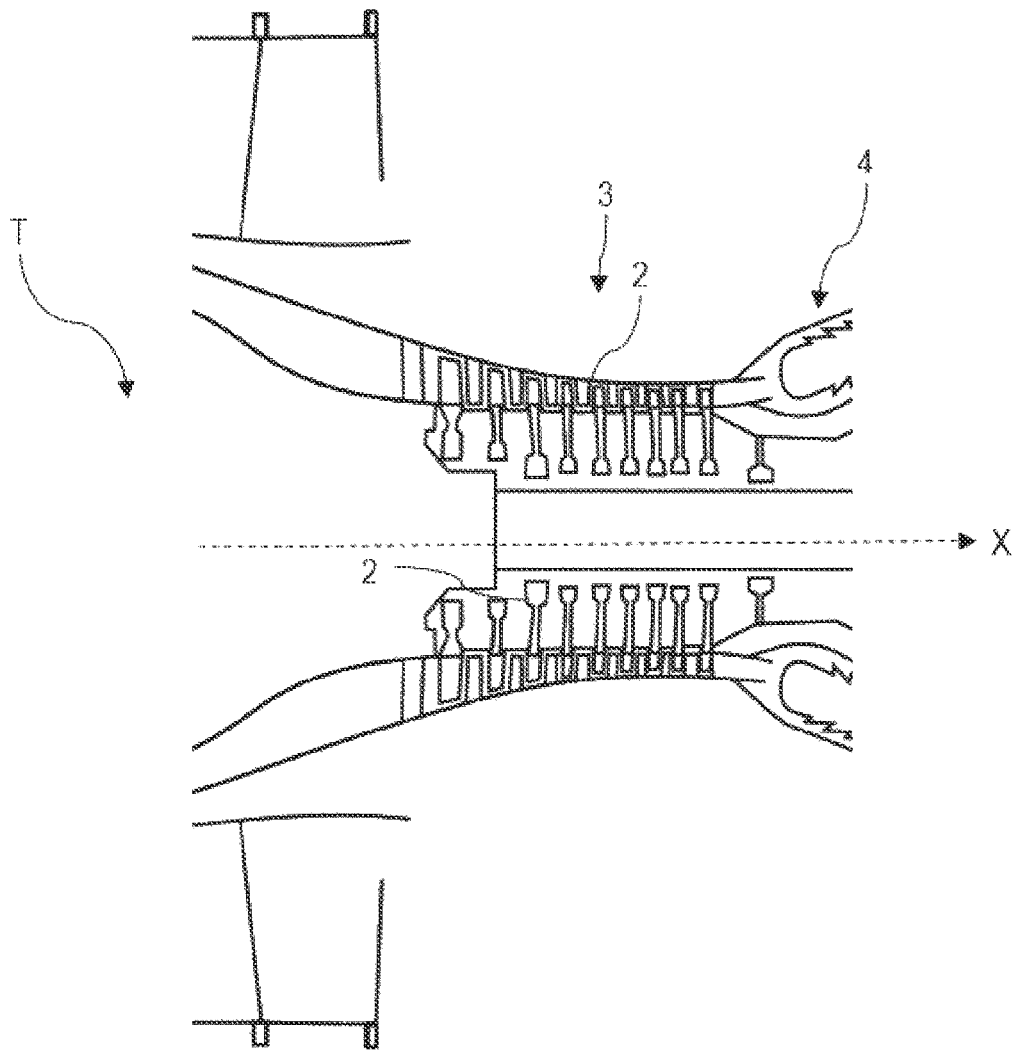
FIG. 1 is a representation in longitudinal section of a turbomachine according to an embodiment of the invention.

With reference to FIG. 1, a turbomachine T is represented extending longitudinally along an axis X and making it possible to displace the aircraft from a flow of air entering into the turbomachine T and circulating from upstream to downstream. Hereafter, the terms "upstream" and "downstream" are defined with respect to the axis X oriented from upstream to downstream. Similarly, the terms "interior" and "exterior" are defined along the radial direction with respect to the longitudinal axis X. In a known manner, the turbomachine T comprises a compressor 3, a combustion chamber 4 and a turbine to rotationally drive the compressor 3. The compressor 3 comprises one or more rotors 2, mounted in line along the longitudinal axis X to compress the flow of air circulating from upstream to downstream in a primary flow path of the turbomachine T.

Figure 2:
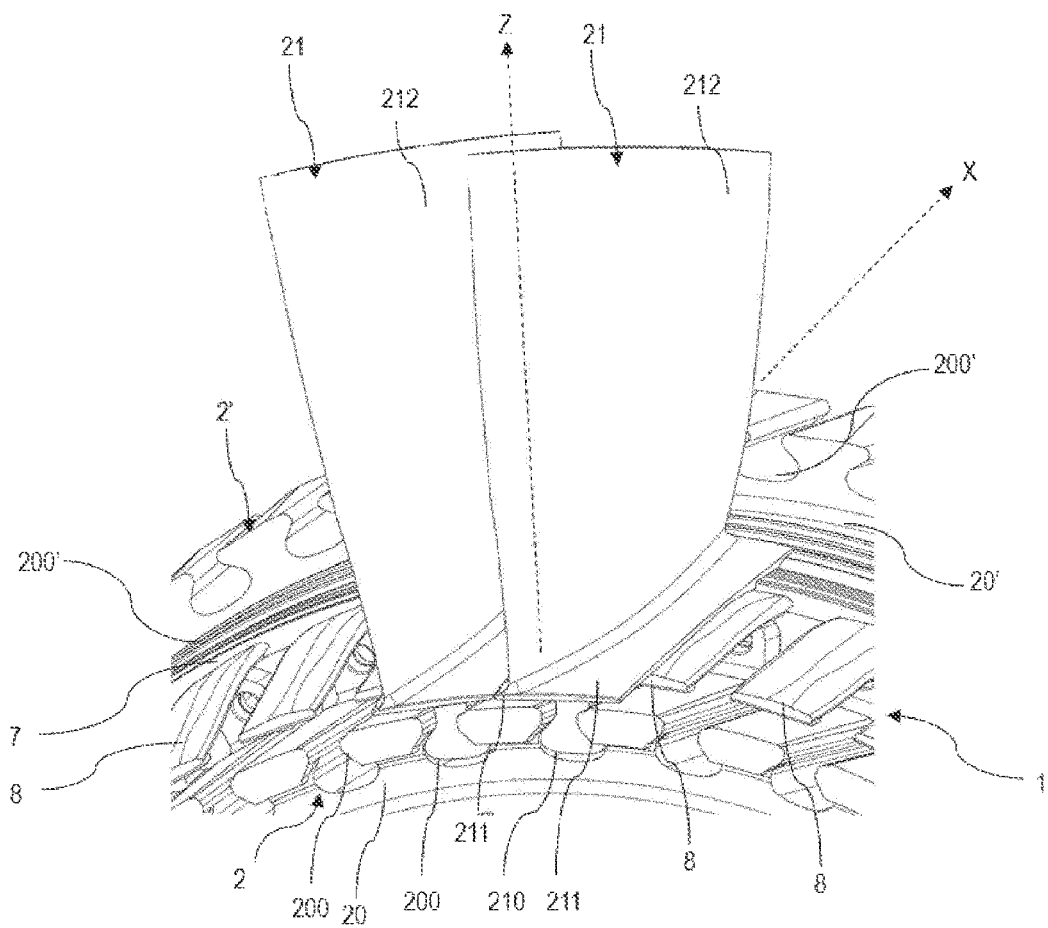
FIG. 2 is a three-dimensional schematic representation of a portion of turbomachine rotor equipped with the damping device according to the invention and with two blades.

As illustrated in FIG. 2 representing an embodiment of the invention, a rotor 2 comprises a rotor disc 20 extending transversally with respect to the longitudinal axis X and integral with a power transmission shaft (not represented) as well as a plurality of blades 21. The rotor disc 20 comprises a plurality of housings 200, also called honeycombs, formed on the outer periphery of the rotor disc 20, in which the blades 21 are respectively mounted by axial insertion along the longitudinal axis X. The blades 21 extend in a same plane transversal to the longitudinal axis X. In FIG. 2, the blades 21 are identical with each other but it goes without saying that the blades 21 could be different. Hereafter, for reasons of clarity, a single blade 21 is described with reference to FIG. 2.

In a known manner, a blade 21 extends radially along an axis Z defined with respect to the longitudinal axis X and comprises successively a mounting root 210, configured to be mounted axially in one of said housings 200 of the rotor disc 20, a platform 211, making it possible to maintain at a distance a predetermined blade 21 with respect to adjacent blades 21 and to reconstitute the inner surface of the primary flow path and an air deflector vane 212 extending radially with respect to the longitudinal axis X. The blade 21 extends radially in mounted position. The mounting root 210 is thus qualified as radially interior whereas the vane 212 is qualified as radially exterior with respect to the longitudinal axis X.

In order to limit the relative movement of the blades 21 with respect to the rotor disc 20, the rotor 2 comprises a damping device 1 positioned between the outer periphery of the rotor disc 20 and the platforms 211 of the blades 2 so as to press the blades 21 in a radially exterior manner into their housings 200.

Figure 3:
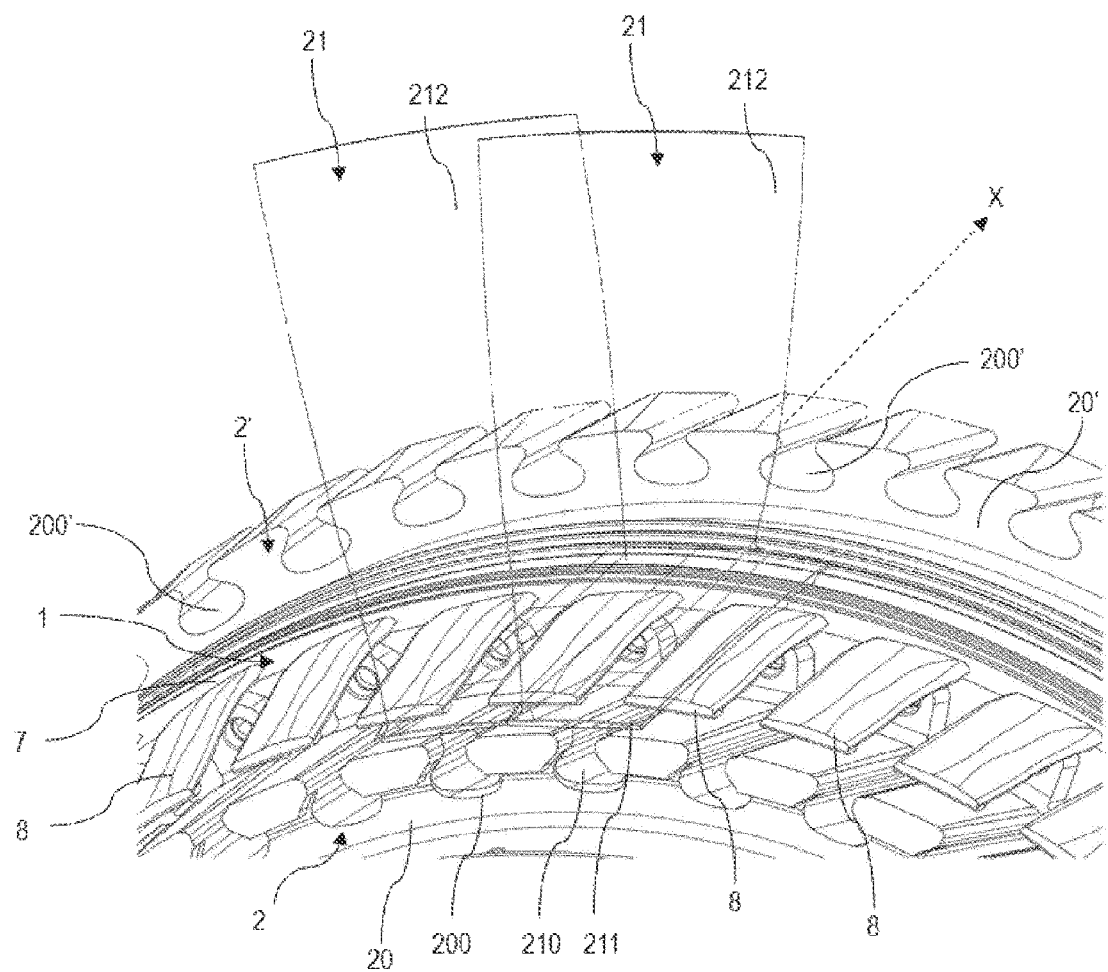
FIG. 3 is a three-dimensional schematic representation of a portion of turbomachine rotor equipped with the damping device according to the invention with the blades transparent.

An embodiment of a damping device 1 according to the invention is described with reference to FIGS. 2 to 6. As illustrated in FIG. 3, the damping device 1 comprises a support ring 7 and a plurality of damping members 8 which are integral with the support ring 7. In a preferred manner, the damping device 1 is made out of metal, preferably stainless steel so as to have high mechanical strength as well as flexibility to improve damping. However, it goes without saying that other materials could be used.

In a preferred manner, the damping device 1 is one-piece. In other words, the damping members 8 are derived from material of the support ring 7. This makes it possible to achieve optimal damping by spring effect while reducing the manufacturing cost.

According to the invention and with reference to FIGS. 2 to 6, the support ring 7 extends transversally with respect to the longitudinal axis X. Thus, the longitudinal axis X passes through the center of the support ring 7. The support ring 7 is configured to be positioned on the outer periphery of the rotor disc 20. The damping members 8 may thus be directly in contact with the platforms 211 of the blades 21. In this example, the support ring 7 is positioned downstream of the housings 200 in order to be able to be positioned on a rotor disc 20' situated downstream of said rotor disc 20 as illustrated in FIG. 2.

Figure 5:
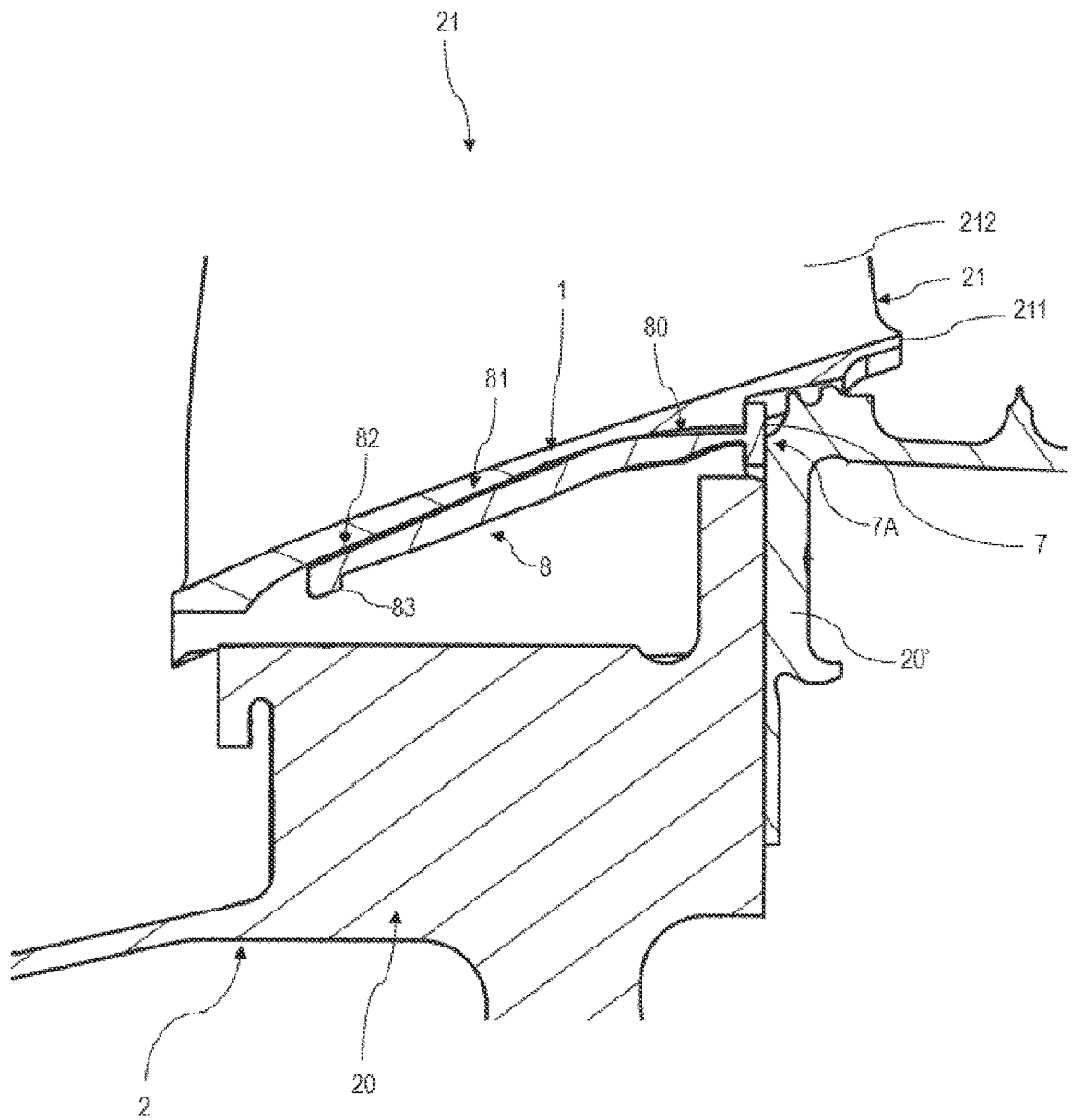
FIG. 5 is a schematic representation in transversal section of a portion of turbomachine rotor equipped with the damping device according to the invention.

According to an aspect of the invention, the support ring 7 has a diameter slightly greater than the diameter of the rotor disc 20 so as to be positioned on the rotor disc 20 near to the platforms 211 of the blades 21 which are mounted thereafter. As illustrated in FIG. 5, the insertion of the blades 21 into the housings 200 of the rotor disc 20 advantageously ensures the radial and longitudinal blocking of the support ring 7. The support ring 7 is in fact advantageously blocked longitudinally downstream by the downstream rotor disc 20', radially outwards by the platforms 211 and radially inwards by the rotor disc 20. Thus, any relative movement between the damping device 1 and the downstream rotor disc 20' is cancelled, which eliminates the risk of wear.

The support ring 7 is preferably flat and has a low thickness in order to be able to be positioned in a practical manner on the downstream rotor disc 20', without increasing the bulk. In a preferred manner, the support ring 7 comprises a downstream flat surface 7A configured to be positioned against an upstream surface, preferably substantially radial, of the downstream rotor disc 20'.

According to the invention and with reference to FIGS. 2 to 6, the damping members 8 extend projecting upstream from the support ring 7. More precisely, each damping member 8 is configured to extend under the platforms 211 of two adjacent blades 21 so as to exert a radial force directed outwards so as to damp the relative radial movements of the mounting roots 210 of said adjacent blades 21 in their housings 200. In a preferred manner, each damping member 8 is in the form of a spring blade configured to exert a radial force outwards. As illustrated in FIGS. 2 and 3, each damping member 8 extends cantilevered upstream.

The damping members 8 are spread out in a uniform manner on the periphery of the support ring 7 so as to enable damping of all the blades 20. In a preferred manner, there are as many damping members 8 as blades 21 in order to enable uniform damping.

Figure 4:
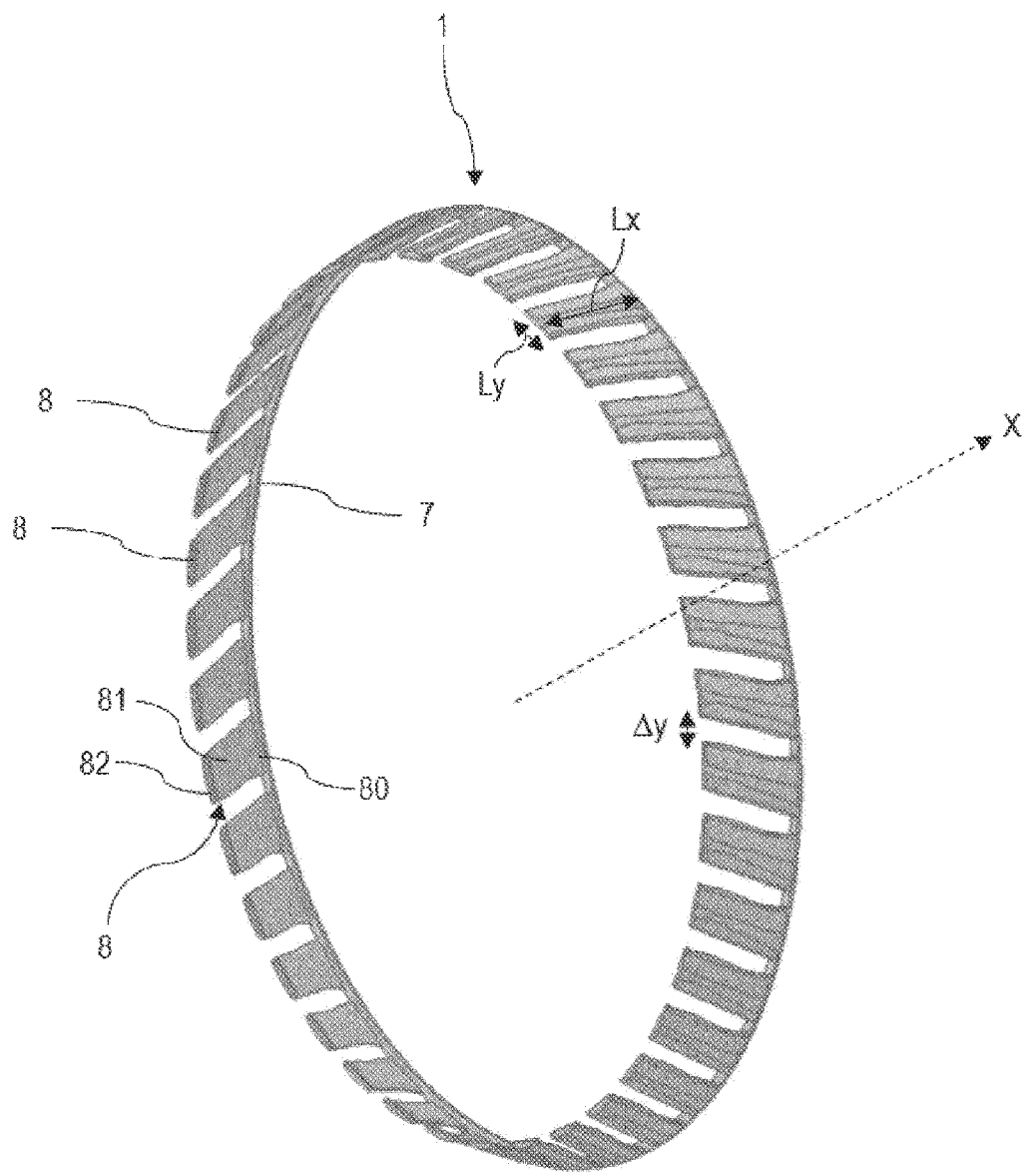
FIG. 4 is a schematic representation in perspective of the damping device according to the invention.

In a preferred manner, with reference to FIG. 4, two adjacent damping members 8 are tangentially spaced apart with respect to the axis X by an angular distance Δy which corresponds approximatively to the width of a mounting root 210 of a blade. In other words, each damping member 8 is configured to be situated in a cavity formed between two mounting roots 210 of adjacent blades 21.

Still with reference to FIG. 4, each damping member 8 has a length Lx comprised between 50 mm and 60 mm, a width Ly comprised between 20 mm and 25 mm and a radial thickness comprised between 0.5 mm and 1 mm. The length Lx is determined to enable optimal support of the platforms 211 of the blades 21, in particular, over more than 50% of their length. The length Ly is determined as a function of the tangential spacing between two adjacent mounting roots 211. In this example, the length Ly is substantially equal to the spacing between two mounting roots 210 of adjacent blades 21 so as to stress in a simultaneous manner the platforms 211 of two adjacent blades 21. Nevertheless, is goes without saying that a damping member 8 could only extend under a single platform 211 of a blade 21.

In a preferred manner, the radial thickness is low compared to the other dimensions to reduce the mass of the damping device 1 while having sufficient thickness to enable sufficient mechanical strength and a spring effect.

Thanks to the invention, when the turbomachine T is in operation, the relative movements existing between the mounting roots 210 of the blades 21 and their housings 200 are greatly reduced. In addition, each damping member 8 is not liable to be displaced when the turbomachine T is in operation given that it is integral with the support ring 7 which is itself blocked by the rotor discs 20, 20' and the platforms 211 of the blades 21. A damping member 8 is thus not liable to increase the wear of the mounting roots 210 or that of the downstream rotor disc 20'.

Figure 6:
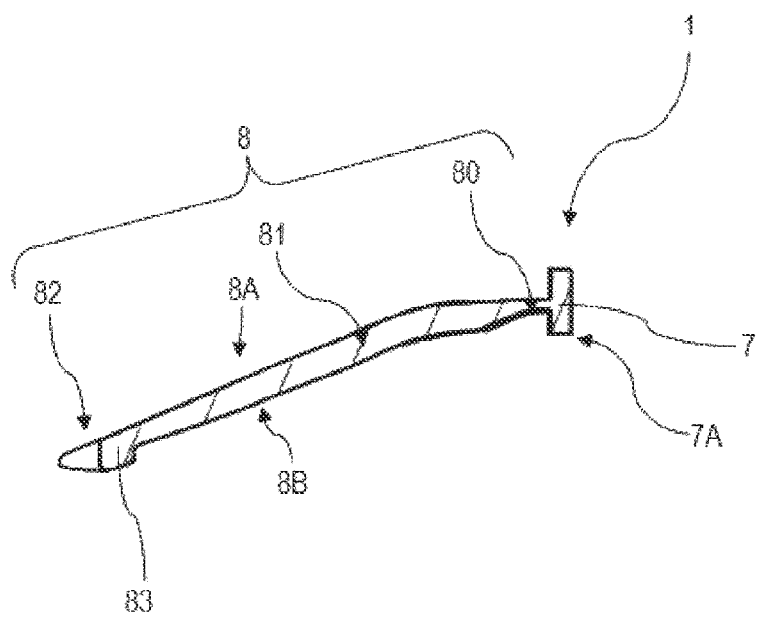
FIG. 6 is a schematic representation in transversal section of the damping device according to the invention and FIG. 7 is a schematic representation of a method for manufacturing a damping device according to the invention.

According to the invention, the thickness of the damping member 8 is not constant over its length so as to enable optimal damping. As illustrated in FIGS. 5 and 6, each damping member 8 comprises a proximal portion 80, having a proximal thickness E80, connected to the support ring 7, a freely mounted distal portion 82, having a distal thickness E82, and a central portion 81, having a central thickness E81, formed between the proximal portion 80 and the distal portion 82. According to an aspect of the invention, the proximal thickness E80 is lower than the central thickness E81, preferably by at least 50%, so as to make it possible to offer flexibility to the central portion 81 which can thus pivot on account of its flexibility in the manner of a spring blade. In other words, the proximal portion 80 forms a hinge which makes it possible to improve damping. The thickness E80 of the proximal portion 80 remains sufficiently important to ensure mechanical strength.

In this example, the distal thickness E82 is greater than the central thickness E81, preferably, by at least 100%. Advantageously, the distal portion 82 has an added thickness to increase its mass, which increases the pressing force at the level of the distal portion 82 under the effect of centrifugal forces and the lever effect on account of the cantilevered mounting. Thanks to this characteristic, the platform 211 of each blade 21 is pressed in an optimal manner even if the length of a damping member 8 is lower than the length of a platform 210.

In this example, still with reference to FIG. 6, the damping member 8 comprises a flat upper face 8A and an inner face 8B comprising a protuberance 83, or bead, corresponding to the added thickness. Thus, the added thickness only affects the inner face 8B and not in any way the upper face 8A configured to be in contact with the platforms 211 of the blades 21. In an advantageous manner, the protuberance 83 may be advantageously machined in order to balance the mass of the rotor disc 20 equipped with the damping device 1, that is to say to correct imbalances linked to dynamic damping.

Figure 7:
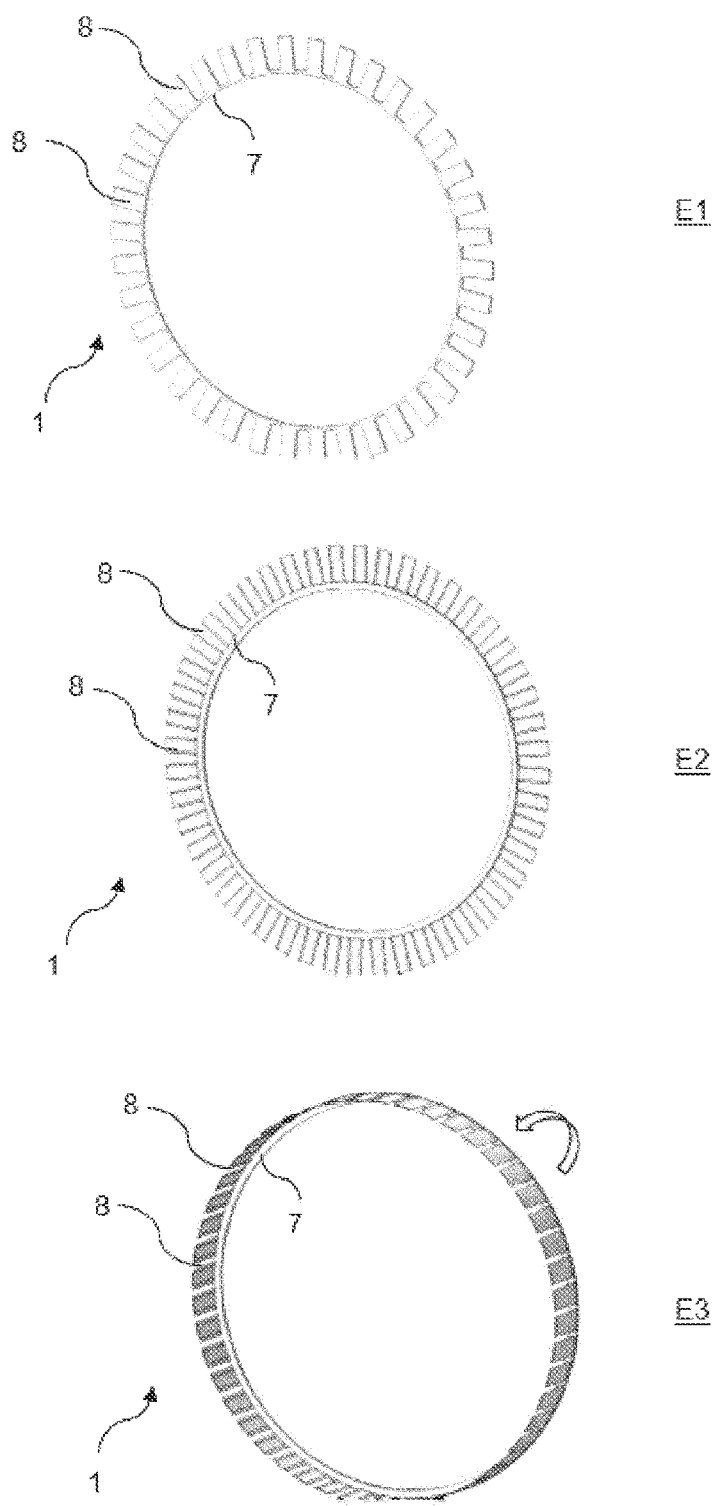

Such a damping device 1 may be obtained for a reduced cost. With reference to FIG. 7, an exemplary embodiment of a manufacturing method successively comprises a cutting step E1, a stamping step E2 and a folding step E3. During the cutting step E1, the flat contours of the damping device 1 are cut, by means of a cutting member, out of a thin metal panel so as to form the support ring 7 and the damping members 8, the damping members 8 extending radially with respect to the axis of the support ring 7. Following the cutting step E1, the damping members 8 are stamped so as to confer on them a relief and calibrated thicknesses. Then, following the stamping step E2, each stamped damping member 8 is folded in order to be oriented in the axial direction upstream during the folding step E3. In this example, the damping members 8 are folded by around 90°.

The damping device 1 is mounted in a radially exterior manner to the rotor disc 20 of which the blades 21 must be damped. With reference to FIG. 5, the downstream face 7A of the support ring 7 is pressed against an upstream face of the rotor disc 20' positioned downstream of the rotor disc 20 of which the blades 21 must be damped. The damping members 8 are positioned circumferentially between the housings 200 so as not to hinder the mounting of the blades 21.

Following the positioning of the damping device 1, the damping members 8 extend projecting upstream and make it possible to participate in the guiding of the platforms 211 during the insertion of the blades 21 into the housings 200 of the rotor disc 20. During the mounting of the blades 21, the distal portion 82 of the damping members 8 is stressed radially inwards by taking advantage of the proximal portion 80 which is flexible. Thus, on account of this prestress, each damping member 8 acts as a spring blade to press the platforms 211 of the blades 21 outwards.

Following the positioning of the blades 21, each damping member 8 extends tangentially between two adjacent mounting roots 210 and radially between the outer periphery of the rotor disc 20 and the platforms 211 of adjacent blades 21.

Following the positioning of the blades 21, the support ring 7 is blocked on the one hand longitudinally downstream by the downstream rotor disc 20' and, on the other hand, radially between the platforms 211 and the outer surface of the rotor disc 20.

In a preferred manner, a damping device 1 according to the invention may be used in an existing turbomachine instead of existing dampers. According to a preferred aspect, the mounting root 210 of the blades 21 may be machined, for example by formation of a recess, in order to enable a bearing of the blade 21 on the support ring 7.

When the turbomachine T is in operation, the rotor disc 20 of the compressor 3 of the turbomachine T is rotated along the longitudinal axis X. By centrifugal effect, each mounting root 210 of a blade 21 is displaced radially towards the outer part of its housing 200. In an analogous manner, each damping member 8 is rotationally driven by the rotor disc 20. By centrifugal effect, each damping member 8, which extends under two platforms 211, exerts a radial force outwards, which makes it possible to achieve an outwards pressing that is optimal.

During a reduction in the speed of the turbomachine T, the speed of rotation of the rotor 2 decreases, leading to a decrease in the centrifugal effect developed. A mounting root 210 of a blade 21 is then liable to be displaced in its housing 200. Thanks to the damping device 1 according to the invention, the platforms of the blades 21 are maintained pressed radially outwards even when the centrifugal forces are decreased. Thanks to the spring effect of the damping members 8, any radial variation is compensated dynamically.

The added thickness of the distal portion 82 of each damping member 8 makes it possible to achieve efficient pressing under the effect of centrifugal forces, in particular, at mid-length of the platforms 211.

Thanks to the invention, the phenomena of wear at the level of the blades 21 and the rotor disc 20 are greatly reduced. Furthermore, advantageously, a damping member 7 is not liable to increase wear of the rotor disc 20' situated downstream of the rotor disc 2 because it is integral with the support ring 7 itself positioned in a stable manner against the downstream rotor disc 20'. The lifetime of the downstream rotor disc 20', of which the cost is high, is thus preserved.

The invention claimed is:

1. A compressor rotor for aircraft turbomachine extending longitudinally along an axis X, said rotor comprising a rotor disc extending transversally with respect to the axis X and a plurality of blades, said rotor disc comprising a plurality of housings formed on an outer periphery of the rotor disc, each blade extending radially with respect to the axis X and comprising a mounting root, radially interior, configured to be mounted in one of said housings, a platform and a radially exterior air deflector vane, the rotor comprising a damping device which comprises:
   a support ring which extends transversally with respect to the axis X and which is positioned on the outer periphery of the rotor disc; and
   a plurality of damping members, integral with the support ring and projecting upstream from the support ring, each damping member extending under at least one platform of a blade so as to exert a radial force outwards so as to dampen the radial displacement of said blade when the turbomachine is in operation.

2. The rotor according to claim 1, wherein the support ring is circular and each of the plurality of damping members has distal portion that is located upstream of a central portion and a proximal portion.

3. The rotor according to claim 1, wherein each damping member is mounted in a prestressed manner under at least one platform of a blade so as to exert a radial force outwards so as to damp the radial displacement of said blade when the turbomachine is in operation.

4. The rotor according to claim 1, wherein the plurality of damping members are spread out uniformly on the circumference of the support ring.

5. The rotor according to claim 1, wherein at least one damping member comprises a proximal portion connected to the support ring, a freely mounted distal portion and a central portion formed between the proximal portion and the distal portion.

6. The rotor according to claim 5, wherein the proximal portion has a thickness that is less than a thickness of the central portion.

7. The rotor according to claim 5, wherein the distal portion has a thickness that is greater than a thickness of the central portion.

8. The rotor according to claim 1, wherein at least one damping member comprises a flat outer face, configured to come into contact with a platform, and an inner face, opposite to the outer face, comprising a protuberance.

9. The rotor according to claim 1, wherein each damping member extends under at least the platforms of two blades.

10. The rotor according to claim 1, comprising a downstream rotor disc, positioned downstream of the rotor disc in which the blades are mounted, the support ring is positioned against the downstream rotor disc.

11. The rotor according to claim 1, wherein each damping member extends cantilevered upstream.

12. The rotor according to claim 1, wherein each damping member is in the form of a spring blade configured to exert a radial force outwards.

13. A compressor rotor for aircraft turbomachine extending longitudinally along an axis X, said rotor comprising a damping device and a rotor disc extending transversally relative to the axis X and having a plurality of blades and a plurality of housings formed on an outer periphery of the rotor disc, each of said plurality of blades extending radially with respect to the axis X and comprising a mounting root mounted to one of said housings, a platform, and a radially exterior air deflector vane, wherein the damping device comprises:
   a support ring extending transversally relative the axis X and positioned on an outer periphery of the rotor disc; and
   a plurality of damping members attached to and extending upstream of the support ring, each of the plurality of damping members positioned under at least one platform of a blade to exert a radial force to dampen the radial displacement of said blade when the turbomachine is in operation.

14. The rotor according to claim 13, wherein each damping member of the plurality of damping members is mounted in a prestressed manner to exert a radial force to dampen the radial displacement of said blade when the turbomachine is in operation.

15. The rotor according to claim 13, wherein the plurality of damping members are spread out along a circumference of the support ring.

16. The rotor according to claim 15, wherein the plurality of damping members are evenly spaced along the circumference of the support ring.

17. The rotor according to claim 13, wherein at least one damping member comprises a proximal portion connected to the support ring, a freely mounted distal portion, and a central portion formed between the proximal portion and the distal portion.

18. The rotor according to claim 17, wherein the proximal portion has a thickness that is less than a thickness of the central portion.

19. The rotor according to claim 17, wherein the distal portion has a thickness that is greater than a thickness of the central portion.

20. The rotor according to claim 13, further comprising a downstream rotor disc positioned downstream of the rotor disc, and wherein the support ring is positioned against the downstream rotor disc.

* * * * *